350-358 SR

XR 3,744,039

TX 3093T 7/5/75

United Stat

Hrbek et al.

[11] 3,744,039

[45] July 3, 1973

[54] SINGLE-LASER SIMULTANEOUS MULTIPLE-CHANNEL CHARACTER GENERATION SYSTEM

[75] Inventors: George W. Hrbek, Arlington Heights; Adrianus Korpel, Prospect Heights; William H. Watson, Roselle, all of Ill.

[73] Assignee: Zenith Radio Corporation, Chicago, Ill.

[22] Filed: Sept. 9, 1971

[21] Appl. No.: 179,139

[52] U.S. Cl...... 340/173 LM, 350/161, 178/DIG. 18

[51] Int. Cl. .......... G11c 13/04

[58] Field of Search .......... 350/161; 178/DIG. 18; 340/173 LM

[56] References Cited

UNITED STATES PATENTS 3,055,258 9/1962 Huruitz .......... 178/DIG. 18
3,488,437 1/1970 Korpel .......... 340/173 R
3,571,507 3/1971 Korpel .......... 340/173 R

*Primary Examiner*—Terrell W. Fears
*Attorney*—John J. Pederson and John H. Coult

[57] ABSTRACT

A character imaging system utilizing a single laser source beam, a Bragg cell, and a plurality of oscillators driving the cell to form a like plurality of diffracted beams. Each such beam is gated ON-OFF in intensity in accordance with its corresponding oscillator output which in turn is gated by a respective gate signal. The intensity of each beam is made independent of the variations in the remaining beams by control of the diffraction efficiency of the Bragg cell, or by attenuation of the applied power to the cell varying in accordance with the number of diffracted beams. The system preferably incorporates a computer output as a source of digital information channels supplying signals for the control of respective gate signals to the oscillators.

24 Claims, 4 Drawing Figures

3744039
OR IN 340/173LM

SINGLE-LASER SIMULTANEOUS MULTIPLE-CHANNEL CHARACTER GENERATION SYSTEM

BACKGROUND OF THE INVENTION

The present invention relates to information translation systems utilizing laser light and Bragg acousto-optic cells to process such light in accordance with image information. More particularly, it relates to display systems in which a plurality of light beams are each separately modulated with a respective channel of image information and displayed simultaneously.

Systems of the aforementioned type displaying a plurality of information channels simultaneously have been in increasing demand in the art, in particular for such high speed applications as recording or displaying from computer outputs. Such readout systems, because of the simultaneous use of the plurality of information-modulated output beams, are inherently fast and highly compatible with modern multi-channel information delivery systems of which a computer is only one example. Typical single-beam cathode-ray tubes and single-channel light beam systems, both of which depend on the scanning of a single beam over the display or recording surface, are inherently slower and require more complex scanning mechanisms. On the other hand, typical simultaneous multi-channel readout systems require a plurality of lasers, together with respective modulators of either electro-optical or acousto-optic type, to accommodate the plurality of channels which it is desired to simultaneously display.

Therefore, it is a general object of the invention to provide an information-translation system utilizing simultaneously a plurality of light beams all derived from a single light source, and each independently modulated with a respective channel of information.

It is a more particular object of the invention to provide an information display system utilizing a single acousto-optic Bragg cell to provide a plurality of separate light beams, each independently modulated in accordance with a different signal.

It is another object of the invention to provide a multi-channel single laser source information display system in which the intensity of each light channel is independent of the variations in intensity of the other channels.

It is yet another more particular object of the invention to provide a multiple-beam alphanumeric imaging system utilizing only a single laser source beam for the display of character information generated by a computer or other digital source.

BRIEF DESCRIPTION OF DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
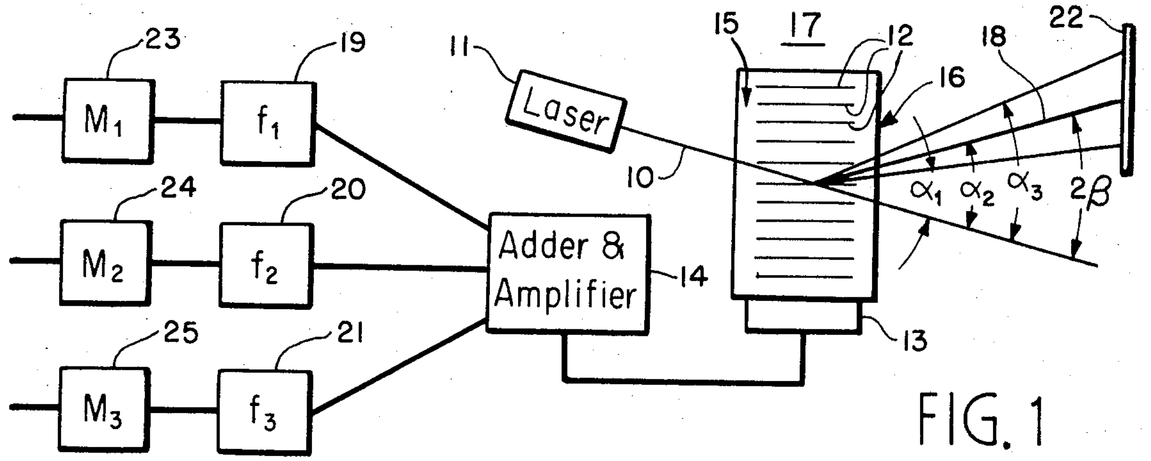
FIG. 1 is a schematic diagram of a basic display system providing a plurality of diffracted beams from a single light source.

In FIG. 1 a beam of light 10 is produced by a laser 11, the light having a wavelength $\lambda$. Propagating across the path of beam 10 are a series of sound waves 12 launched by a transducer 13 excited by a suitable signal source. The sound waves, of wavelength $W_1$ in a typical embodiment propagate in a medium 15 such as water confined to an enclosure 16 having sidewalls transparent to beam 10. The entire sound propagating assembly, here designated 17, is frequently referred to as a sound cell.

When light beam 10 is incident upon sound wavefronts approximately at the Bragg angle $\beta$, a portion of the light beam emerging from cell 17 is diffracted along a path 18 forming an angle of $2\beta$ with the undiffracted beam portion. Light beam 10, having laser 11 as its source, is a collimated light beam and enters cell 17 as such, substantially as shown along a path to form an angular Bragg relationship with the sound wavefronts. Bragg angle $\beta$ is determined in accordance with the Bragg relationship:

$$\sin \beta = \pm \lambda/2W$$

In typical applications, the actual value of angle $\beta$ is sufficiently small so that the left term in the Bragg equation is simply the angle $\beta$ itself.

The diffracted light in beam 18 travels to image screen 22, where it appears to the observer as a spot of light. As will be evident from an examination of the Bragg equation, the value of the diffraction angles is a function of the wavelength (or frequency) of the sound waves and, hence, is correspondingly a function of the frequency of the signals generated by the signal source exciting transducer 13. In this case, the signal source here designated 14 is an adder and power amplifier receiving the output of three oscillators 19, 20, and 21 of different predetermined frequencies $f_1$, $f_2$, and $f_3$, respectively, each of which is controlled by a respective one of amplitude modulators 23, 24 and 25. Thus adder 14 simultaneously receives three oscillator output signals, individually of a different frequency and an independently controlled amplitude, and applies their sum to transducer 13. In response to such excitation, cell 17 now correspondingly diffracts incoming light beam 10 into three light beams at respective angles $\alpha_1$, $\alpha_2$, and $\alpha_3$ which in turn develope three corresponding spots spaced along screen 22 in the direction of sound propagation, here the vertical direction. The three spots individually have respective intensities corresponding to the respective amplitudes of the three signals of frequencies $f_1$, $f_2$, and $f_3$. Up to a maximum limit determined by the resolution *n* of the sound cell, the number of signals simultaneously developed by adder 14 may be increased to any numer by, for example, the addition of more oscillators each of a different predetermined frequency, as a result of which cell 17 diffracts a corresponding plurality of beams to produce a like plurality of spots distributed across screen 22. Each of the spots has a position on screeen 22 and an intensity of brightness corresponding to the frequency and amplitude, respectively, of a particular one of the signal components added together by adder 14.

Thus, each of the plurality of signals supplied by the oscillators 19, 20, and 21 are associated with a corresponding plurality of video picture elements, each signal respectively representing one of such elements in position and amplitude. The corresponding plurality of diffracted beams simultaneously produce an entire image line of picture elements. To complete an image raster, the plurality of beams must be scanned in the orthogonal direction, while the intensity of each individual beam is varied as it is scanned in accordance with the time-sequential variations in the amplitude of its respective oscillator output signal. To effectuate this scan, a generally similar system may be employed to move the light beams in the orthogonal direction, with the sound frequency value in such system being repetitively scanned through a predetermined range so that the value of the diffraction angle, which is a function of the frequency of the sound waves, will vary accordingly. However, if great speed is not required a simple galvanometer-controlled mirror or, in photographic recording systems a film transport, may be employed to accomplish the orthogonal deflection.

As compared to the single-Bragg-diffracted beam case, the generation of a simultaneous plurality of individually modulated diffracted beams is greatly superior for information-translation purposes, but for one serious new difficulty. It has been found that in the FIG. 1 system, the intensity of each of the diffracted beams emerging from Bragg cell 17 is not independent of the intensity variations in the remaining beams, but rather, is normally so dependent on the changes in intensity in these remaining beams that the theoretically expected correspondence between the modulation of each oscillator signal and the intensity modulation of its associated beam is too degraded to be useful for most purposes.

The problem may be illustrated in more rigorous fashion at least for those typical systems in which the soundcell 17 has a fairly linear frequency response, such that the amplifier signal power necessary to diffract light of a given intensity is substantially the same for each of the frequencies applied to the cell. We may then make use of the well-known relationship between the signal voltage V applied to the transducer 13 of soundcell 17 and the ratio of light diffracted ($I_1$) to the incident light intensity ($I_o$) of the laser light beam 10;

$$I_1/I_o = \sin^1 k_1 V$$

where $k_1$ is a constant. This relationship may also be given in terms of the acoustic power P applied to the cell by transducer 13:

$$I_1/I_o = \sin^2 k_2 \sqrt{P},$$

where $k_2$ is a constant.

We initially adjust the FIG. 1 system so that the intensity of each of the spots of screen 22 is the same, with the diffracted light power being shared equally among the beams. This, of course, entails the adjustment of each of the oscillators 19, 20, and 21 to contribute the same maximum acoustic power to the adder 14 and ultimately to the soundcell 17. For simplicity we assume that modulators 23, 24, and 25 merely gate the oscillators so that they are either OFF, or ON at maximum power, at any given time, as are their corresponding diffracted light beams. Note that in practice it may be necessary to slightly vary the actual output power contributed by each oscillator from absolute equality with the other oscillators, to compensate for sound frequencies not at the exact Bragg angle and for variance in transducer response. Thus, $$P \text{ in each beam} = P_T/n\ ,$$

where $P_t$ is the total acoustic power, and $n$ is the total number of diffracted beams.

The ratio of the total intensity $I_T$ of the diffracted light to the intensity $I_o$ of the incident light may then be expressed:

$$I_T/I_o = \sin^2 k \quad \sqrt{P_T/n} \times n = \sin^2 k \quad \sqrt{P_T}\ , \text{ or}$$

$$k = \frac{\arc\sin \sqrt{\dfrac{I_T}{I_o}}}{\sqrt{P_T}}\ .$$

We may now find the intensity of any single diffracted beam, at any given time, where m is the number of beams on at any given time:

$$I \text{ of any beam}/I_o = 1/\text{m} \sin^2 [k( \sqrt{m \times P_T/n})],$$

Substituting for $k$:

$$I \text{ of any beam}/I_o = 1/m \sin^2 [(\arc\sin \sqrt{I_T/I_o}) \sqrt{m/n}]$$

To illustrate the application and significance of the above relationship, a useful simple example is the case of the FIG. 1 system wherein only two of the oscillators, say 19, and 20, are operating, both with a steady equalized maximum output power. Assuming that the system is operated so as to diffract 100 percent of the incident light from beam 10 (so that $I_t/I_o = 1$), each of the two diffracted beams will have one-half of the total diffracted light intensity, i.e., the ratio $I/I_o$ for each is 0.5.

However, when only one of the oscillators are operated (at the same power level as before), and thus only one diffracted beam is ON, i.e., $m = 1$, we find that $$I/I_o = (1/1) \sin^2 [90° \times \sqrt{1/2}\ ] = \sin^2 90°/\sqrt{2} = 0.8$$

or that the intensity of the single remaining beam has increased by 60 percent, although the power of the oscillator output signal and the acoustic power corresponding to that beam has not increased at all.

Figure 3:
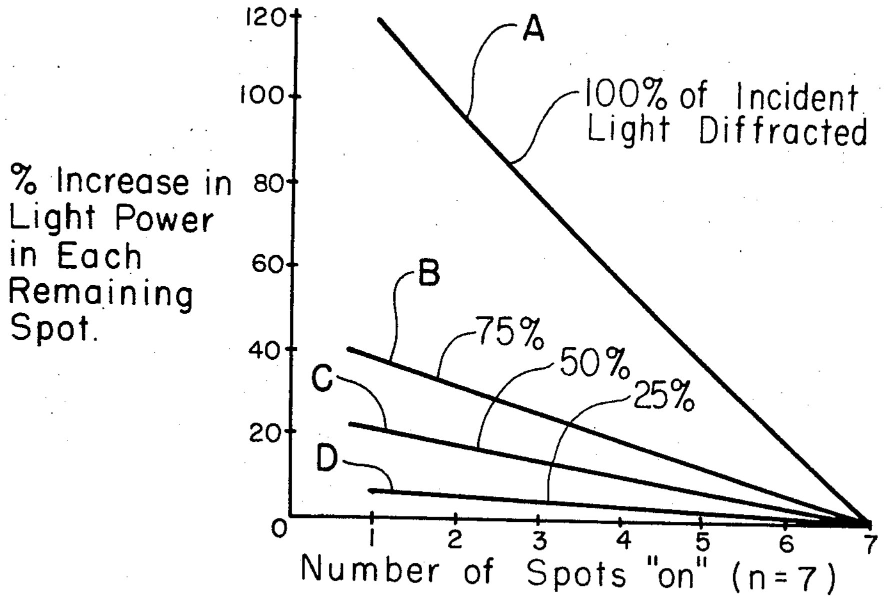
FIG. 3 is a biaxial representation demonstrating the capability of one embodiment of the invention to maintain intensity variations in each diffracted beam independent of variations in the others of such beams.

Of course, the same problem occurs with a larger given plurality of diffraction beams; the distortion in spot brightness at any given time varies with the number of diffracted beams being generated at that time, and this functional relationship is a different one at each level of light diffraction efficiency. This is shown by FIG. 3, which sets forth the different intensity-distortion curves which hold at some representative light efficiencies in a typical system of the FIG. 1 type utilizing seven oscillators and seven diffracted beams. A more detailed explanation of this figure is given below.

Figure 2:
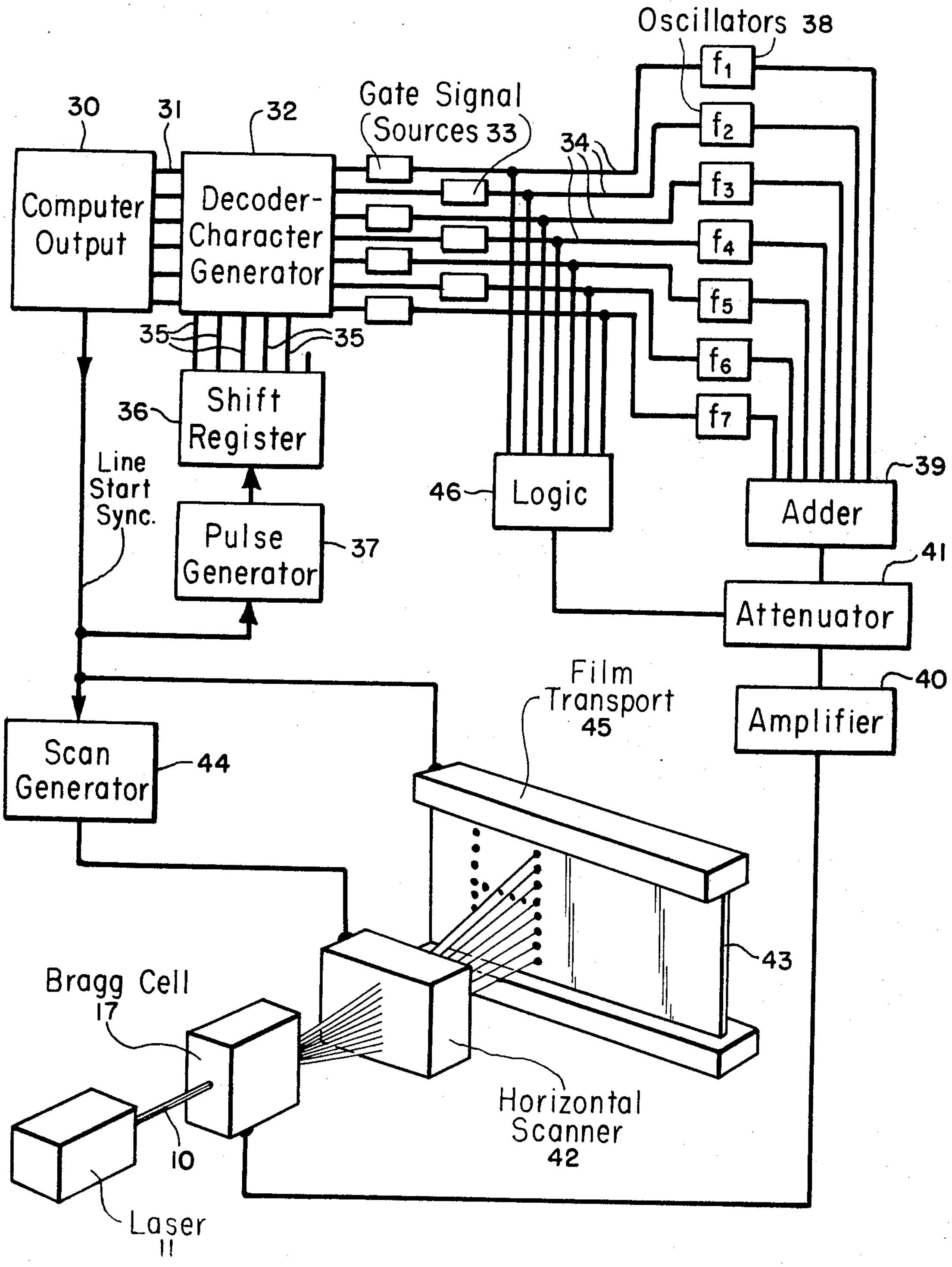
FIG. 2 is a schematic diagram of a complete character-information display system utilizing the principles of the invention.

The complete prototype system illustrated by FIG. 2 faithfully reproduces alphanumeric image information from a multi-channel source of input signals carrying such information in electrical form and thus overcomes the limitations of the FIG. 1 system. In the particular embodiment illustrated, these signals are supplied by a computer output 30, which delivers character control signals over a plurality of parallel channel output lines 31. These are simultaneously energized by the computer output 30 so that together the control signals comprise a pattern of ON-OFF states, preferably in accordance with a standard binary code; the "USASCII Code" was chosen for this particular embodiment, as well as a computer output having six-bit input into six parallel lines 31.

Each computer channel line is connected to a corresponding input of decoder and character signal generator 32, which is thereby supplied with the binary-coded character control signals from computer output 30. One commercially available example of such a decoder character generator which was chosen for the present embodiment is Texas Instrument's Model TMS-4103 JC. The generator 32 decodes the coded computer signals into a plurality of gate signals, each corresponding to a respective parallel vertically-separated level of characters. The sources of the individual independent gate signals, depicted schematically at 33 here, are actually integral with generator 32; however, it is to be understood that in other variations of the invention not utilizing a decoder of the aforementioned type, the gate signal sources 33 will be physically separate. In other systems, instead of computer output 30, a non-coded source of digital information may be used also have a plurality of channels and corresponding output lines which control an array of separate gate signal sources 33 directly. In any case, the gate signal sources 33 are driven to sequentially deliver over respective output lines 34 the columns of a row-and-column-matrix representation of the desired characters.

In the present embodiment, the character generator 32 is compatible with the aforementioned standard code and supplies gate signals for the production of characters of the 5 × 7 matrix type over seven output lines 34. To accomplish this, it incorporates five column-select control leads 35, which are connected to respective leads of a 6-position shift register 36 distributing sequentially the pulses from a column-select pulse generator 37 controlled by computer output 30. Each column of the character is then sequentially generated by character generator 32 in response to a corresponding pulse over each of the five control leads 35 from column-select generator 37. The pulse generator 36 and register 35 are synchronized to computer output 30 and its rate of delivery of character information.

Each of the output lines of gate signal sources 33, in this case from within character generator 32, are coupled to a respective one of the oscillators 38 which are as described in FIG. 1 except that seven oscillator units are employed, one for each row of the character, and each oscillator is gated OFF or ON at full power in accordance with the absence or presence of a signal on its associated one of lines 34. The frequencies of each of the oscillators 38 are spaced evenly, here over the 20 megahertz interval from 30 to 50 megahertz, in 3⅓ megahertz increments. The adder 39 and power amplifier 40 perform the same function as does adder-amplifier 14 of FIG. 1, except that an attenuator 41 is now also included. As in FIG. 1, the resultant signal from power amplifier 40 powers Bragg cell 17 to diffract beam 10 from laser 11 into a plurality of equally spaced beams, in this case seven, since seven discrete frequencies spaced at equal intervals are employed.

Bragg cell 17 should have a fairly linear frequency response, such that the power necessary to diffract light of a given intensity is nearly the same for each of the frequencies applied to the cell. Although for many applications such a response characteristic is easily obtained or sufficiently approximated by using cells having wide tolerances and bandwidths, one way to positively assure that the cell will have the proper range and quality of response is to utilize the principles of acoustic beam steering as set forth in U.S. Pat. No. 3,493,759 to Robert Adler and assigned to the same assignee. This patent teaches the use of a soundcell transducer comprised of a plurality of steps the arrangement being termed "an echelon transducer array." The action of the echelon transducer is to cause sound beams generated at various frequencies to each have a direction related to its frequency. The direction of each sound beam is such that a fixed input beam is diffracted at the Bragg angle. It is evident that substitution of such an echelon transducer array for the transducer 13 will cause each of the seven sound beams generated in the FIG. 2 embodiment to traverse the light beam 10 at a different angular orientation corresponding to the Bragg angle orientation which is proper for its respective sound frequency, to obtain optimum Bragg interaction of the sound of each frequency with the light beam 10 and produce the corresponding plurality of angularly discrete diffracted output beams, each bearing a channel of information. In this manner we insure that when the system is in the ALL-BEAMS-ON condition, the available diffracting power is shared equally by all the beams, and their respective intensities are substantially equal. In practice, however, the power outputs of each of the oscillators 38 may be varied slightly from absolute equality with each other to obtain such even intensity of the beams; this may be necessary to compensate frequencies not at the exact Bragg angle, or variances in the soundcell transducer frequency response.

The seven diffracted beams from cell 17 are then received by a second Bragg cell 42 operating as a scanner to scan these beams in a direction orthogonal to that of the diffraction of the first cell 17 (here, in the horizontal direction) over a display or recording medium 43. This is accomplished by a scan generator 44 which supplies a scan signal to cell 42 whose frequency sweeps linearly and repetitively through a predetermined range, i.e., 40 megahertz, determined by the value of the total diffraction angle which is desired, in accordance with the Bragg equation, as is well known. Characters are then generated by the controlled ON-OFF action of the individual diffracted beams as the fan of seven diffracted beams from the cell 17 is scanned in the horizontal direction by cell 42. As we have seen, such ON-OFF action of the individual beams occurs in response to the ON-OFF gating of each of the oscillators corresponding to the respective beams by signals over the output lines from character generator 32. The rate of information delivery of the computer output 30 and the sweep of scan generator 44 over the aforementioned predetermined frequency range are synchronized so that a complete line of information is displayed with every scan of generator 44 and cell 42. Since the intrinsic speed capability of acousto-optic scanners such as cell 42 is very high, high rates of character generation may be accommodated.

Although the lines of information scanned out by the apparatus may be directly displayed, in which case medium 43 is a display screen, in the FIG. 2 embodiment the information is recorded, as is usual in high-speed computer information readout applications, and medium 43 is a high-speed photographic film. A film transport mechanism 45 advances a new portion of film after each line of information is scanned, in response to the line start synchronization signal from computer output 30 in the same manner as for scan generator 44 and column-select pulse generator 37. The film transport mechanism may be any one of those known in the art and commercially available for the purpose. The film medium is advanced in the direction orthogonal to that of the scanning of cell 42, in this case the vertical direction, sufficient to obviate overlap of the recorded lines of information, and is of a width sufficient to contain the complete angular scanning range of cell 42.

In the FIG. 2 system, unlike that of FIG. 1, the intensity of each individual beam substantially varies only with its respective modulation, remaining independent of the variations in other beams. Also, although the specific embodiment being described is especially for reproduction of alphanumeric information, the system may be adapted to non-alphanumeric image information with useful gray scale, given suitable respective modulating signals for the control of the power output of the oscillators 38. To appreciate the manner in which such operation is achieved, it is useful to again consider FIG. 3, which sets forth the distortion behavior which is found to be exhibited by a Bragg cell of the type exemplified by cell 17, chosen to have fairly linear frequency response characteristics itself or utilizing the principles of acoustic beam steering to achieve such response, as mentioned above.

Each curve of FIG. 3 is a plot, for respective light diffraction efficiency setting of the Bragg cell, of the intensity distortion of the ON spot compared to the ALL SPOTS ON condition, as a function of the number of spots ON. The intensity distortion itself is given as a percentage change in intensity from the case when all beams or spots are ON. For example, if the cell is operated at 100 percent diffraction efficiency, the distortion when only one spot is ON is such that the light intensity for that spot increases 119 percent over its value when all spots are ON. Similarly, when three spots are ON, each increases 71 percent in light intensity compared to their intensity when all seven spots are ON. The curves have been determined for the present seven-diffracted-beam case, and for soundcell diffraction efficiencies of 100 percent (curve A), 75 percent (curve B), 50 percent (curve C) and 25 percent (curve D); similar curves can be derived for other cases when fewer or greater numbers of beams or other values of cell efficiency are used.

The curves show a deviation from the linear varying with the number of beams ON, which makes clear the difficulty of utilzing a system such as FIG. 1 for information translation. Note that if the cell does not have linear frquency response characteristics as specified above, no such simple functional relationship between the number of spots ON and the intensity may be established, since then not only the number of ON beams, but also which particular beams are ON, must be considered. FIG. 3 also shows that the degree of distortion is greatly dependent on the efficiency with which the soundcell diffracts light, and most importantly, that at diffraction efficiencies of about 25 percent or less (curve D), the intensity distortion introduced by changes in the number of ON beams never exceeds 8 percent which is an acceptable margin of error in many applications.

In accordance with the invention, these findings have been applied to help obtain a substantially distortion-free FIG. 3 system in a simple but effective manner. Light diffraction efficiency is simply sacrificed by operating the Bragg cell in such a manner that only approximately 25 percent of the incident light in beam 10 goes into the diffracted orders, with the remainder emerging in the undiffracted zero order. This is most easily done by simply decreasing the amplitude of the signals produced by the oscillators 38, either by adjusting the outputs of each of the oscillators 38 individually, or collectively, by adjustment of the gain of amplifier 40. Preferably the latter is done, so that adjustment is done in one step and the relative adjustment of the oscillators 38 to compensate for differences in efficiency are not disturbed. It has been found that the greatest intensity distortion at this efficiency is only about 7.4 percent; as we can see from FIG. 3, (curve D), this occurs when only one beam is ON, and is even less with more beams ON. Operation at somewhat greater efficiency is also acceptable if a correspondingly greater deviation in intensity can be tolerated; conversely, operation at even smaller efficiencies minimizes intensity distortion even more.

Ordinarily the sacrifice of light diffraction efficiency will not be cause for concern, since the laser light source 11 is a high intensity one with ample light power. However, for applications in which it is desired to operate at higher diffraction efficiencies, a comparable degree of linearity sufficient for information translation may be obtained by a simple arrangement of a logic circuit 46 and attenuateor 41 to sense the correction needed and adjust amplifier output accordingly. The attenuator 41, which is connected between adder 39 and amplifier 40, responds to an electrical control signal to control the output of power amplifier 40 and impose a controllable amount of attenuation on the excitation signal delivered to cell 17. Such an attenuator is commonly known and used in the art, as is the logic circut whose output is connected to attenuator 41 to provide the aforesaid control signal and which has a plurality of inputs, in this case seven, each connected through a respective one of the lines 34 to oscillators 38.

In this manner, whenever one of the oscillators 38, and thus the corresponding diffracted beam from cell 17, is actuated by character generator 32, the logic circuit also receives part of the actuating pulse, thereby counts the number of beams to be turned on at any instant, and in response delivers one or more control signals to attenuator 41. When light diffraction efficiencies of approximately fifty percent or under are adequate, such correction is particularly easy to accomplish, since the relationship for the Bragg cell 17 between the intensity of diffracted light and the applied acoustic power, and thus the excitation signal from amplifier 40, is fairly linear. Thus the electrical attenuation imposed by attenuator 40 yields a proportional amount of light attenuation.

Figure 3A:
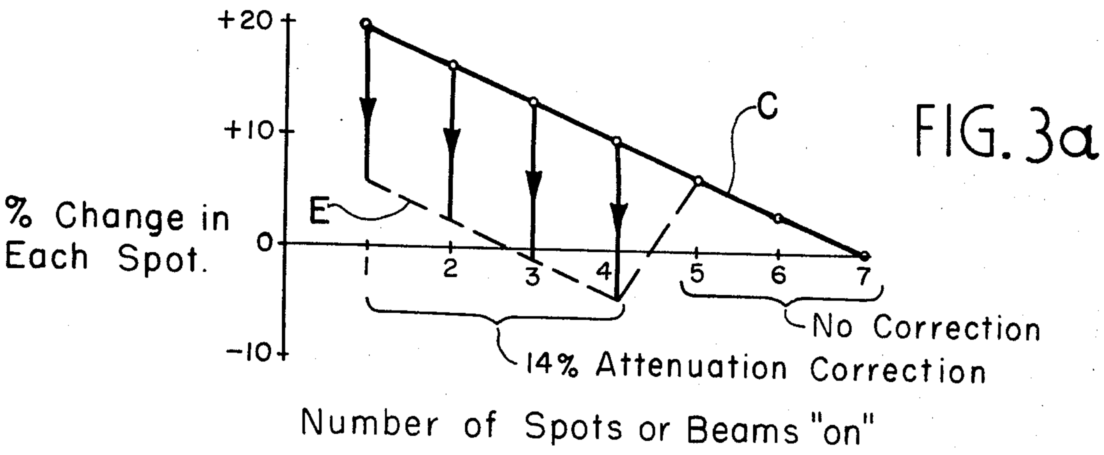
FIG. 3*a* is a biaxial representation helpful in describing the operation of another embodiment of the invention.

In an alternative FIG. 3 system operated at 50 percent diffraction efficiency, the intensity variation in each spot as the beams are switched ON and OFF is held to plus or minus eight percent by employing a simplified attenuator 41 and switching it betwen zero and 14 percent attenuation in response to a command signal. Logic circuit 46 delivers this command signal to attenuator 41, causing the insertion of the 14 percent attenuation only if three or more beams are OFF; if less than three are OFF, the attenuation is zero. FIG. 3*a* shows how this is effective to keep all intensity variations within plus or minus eight percent, curve C showing, as before, the uncorrected intensity variations, and curve E showing the effect of the 14 percent logic-imposed correction.

Of course, applications may arise where more rigorous control of the spot intensity variation is required. In such cases two or more different attenuations may be easily accomplished on command from logic circuitry in a manner similar to that shown above, with, for example, a different attenuation factor for each number of ON-beams. Also in accordance with the invention, as taught above, such logic-controlled attenuation as a means of obtaining linearity sufficient for information translation may be totally dispensed with by operating cell 17 at efficiencies of approximately 25 percent or less. If so operated, logic 46 and attenuator 41 are of course not needed, and may either be removed or by-passed until needed for operation at the higher light diffraction efficiencies.

Such "inefficient" cell operation is especially useful in applications where, for example, it is desired to display images of objects with a gray scale, rather than alphanumerics. In such applications, computer output 30, and decoder-character generator 32, may be eliminated in favor of a multi-channel analog output delivering the desired object information. Each of the information channels then independently controls one of the signal sources 33, which now respond as analog amplitude modulators rather than merely as sources of gate signals. The intensity of each diffracted beam is kept substantially independent of variations in the remaining beams by operating cell 17 at the lower efficiencies near 25 percent or less, as before.

Thus the invention provides a practical information translation system particularly useful in an alphanumeric character display context where very high speed and capacity is needed, especially computer readout applications. The fact that the intensity of each such beam is maintained substantially independent of variations in the others of such beams allows the system to have a freedom from distortion and a faithfulness of reproduction not heretofore obtainable. The present invention thus combines the advantages of high speed and capacity, comparative simplicity both structurally and functionally, and in particular faithfulness of reproduction, to achieve the first truly practical information display of this type.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. A multiple-beam alphanumeric imaging system utilizing a single coherent-light source beam for the generation of characters having a predetermined number of parallel levels and receptive to control signals bearing said character information, comprising:

means responsive to said control signals for generating a plurality of gate signals each corresponding to a respective one of said parallel character levels;

a corresponding plurality of ultrasonic carrier signal sources each of a single discrete frequency different from those of the other carrier signals and all spaced in frequency from one another by a uniform equal interval;

means for respectively applying said gate signals to said carrier signal sources for gating said carrier signals ON and OFF in accordance with said signal;

a Bragg light-sound interaction cell interposed in the path of said source beam, and responsive to an applied driving signal to diffract at least part of said source beam into one or more discrete diffracted beams at diffraction angles dependent on the frequency components of said driving signal;

and means for utilizing said gated carrier signals a said driving signal for said Bragg cell to generate a corresponding plurality of independently gated light output beams.

2. An imaging system as in claim 1 which further includes:

a computer output having a plurality of channels each of which supplies one of said control signals.

3. An imaging system as in claim 2 in which said computer channels supply said control signals in a binary code, and in which said means for generating said gate signals decodes said binary code to supply said plurality of gate signals in accordance with said code.

4. An imaging system as in claim 1 which further includes means for scanning said diffracted means in a direction transverse to that of the diffraction of said source beam by said Bragg cell at a rate in accordance with the rate of delivery of said character information by said control signals to generate said characters.

5. An imaging system as in claim 1 which further includes:

means for maintaining the intensity of each of said diffracted beams substantially independent of changes of intensity in the remaining ones of said diffracted beams.

6. A system as in claim 5 in which said intensity-maintaining means comprises means for limiting the efficiency of said Bragg cell to approximately 25 percent or less.

7. A system as in claim 5 in which said intensity-maintaining means comprises means for variably attenuating said diffracted beams in response to the attenuation of said carrier signal sources.

8. A system as in claim 5 in which said intensity-maintaining means comprises means for variably attenuating the intensity of said beam at every moment in accordance with the number of said carrier signal sources which are actuated at that moment.

9. A system as in claim 1 in which the acoustic power necessary to diffract light of a given intensity is substantially the same for each of the carrier signal frequencies.

10. A multiple-beam information-translation system utilizing spatially coherent source light beam and responsive to a plurality of information signals each independently varying in amplitude with time, comprising:

a plurality of carrier signal sources corresponding in number to said plurality of information signals, said carrier signals each being of frequency different from those of the other carriers;

a corresponding plurality of modulators each amplitude-modulating one of said carrier signals in accorance with a respective one of said information signals;

a Bragg light-sound interaction cell interposed in the path of said source beam, said cell being coupled to said plurality of modulators and responsive to said amplitude-modulated carrier signals to diffract at least part of said beam into a corresponding plurality of angularly discrete diffracted light beams, each intensity-modulated in accordance with a respective one of said modulated carriers;

and means for maintaining the intensity of each of said diffracted beams substantially independent of variations in the intensity of the remaining diffracted beams.

11. An information-translation system as in claim 10 wherein said plurality of information signals are together representative of image information;

and which further includes means for scanning said diffracted beams in a direction transverse to that of the diffraction of said source beam by said Bragg cell at a rate in accordance with the rate of information delivery by said information signals to generate said image information.

12. A system as in claim 10 in which the acoustic power necessary to diffract light of a given intensity is substantially the same for each of the carrier signal frequencies.

13. A system as in claim 10 in which said means comprises means for limiting the efficiency of said Bragg cell to approximately 25 percent or less.

14. A method of translating information from a plurality of information signals, each independently varying in amplitude with time, respectively to a like plurality of output light beams, and wherein a coherent light beam is utilized as a light source, comprising:

generating a plurality of carrier signals corresponding in number to said plurality of information signals, said carrier signals each being of a frequency different from those of the other carriers;

modulating in amplitude each of said carrier signals in accordance with a respective one of said information signals;

Bragg-diffracting at least part of said source beam into a corresponding plurality of angularly-discrete diffracted output light beams, each intensity-modulated in accordance with a respective one of said information signals;

and maintaining the maximum signal intensity of each of said diffracted beams substantially independent of variations in the intensity of the remaining diffracted beams.

15. A system as in claim 10 in which said intensity-maintaining means comprises means for attenuating the intensity of said diffracted beams at every moment in accordance with the number of said carrier signal sources which are actuated at that moment.

16. A system as in claim 1, which further includes means positioned in the path of said light beam preceding said cell for causing said beam to be collimated as it passes into said cell.

17. A system as in claim 10, which further includes means positioned in the path of said light beam preceding said cell for collimating said beam before its passage into said cell.

18. A system as in claim 10, in which said intensity-maintaining means comprises means for adjusting the intensity of each of said diffracted beams in a first sense when the total intensity of the remaining beams changes in the opposite sense.

19. A system as in claim 10, in which said intensity-maintaining means comprises means for attenuating each of said diffracted beams in response to a diminution in the total intensity of the remaining beams.

20. In a light-sound interaction cell for use in a multiple beam information translation system which includes a spatially coherent input light beam and a plurality of sources of electrical input signals or respective different predetermined carrier frequencies for producing from said light beam a like plurality of output light beams each bearing a channel of information corresponding to one of said input signals, said cell being interposed in the path of said input light beam and transmissive of said beam, said cell including a sound propagating medium, the improvement which comprises:

transducer means coupled to said sound propagating medium of said cell and simultaneously receiving said electrical signals for simultaneously launching within said propagating medium a corresponding plurality of sound beams each having a sound frequency and modulation corresponding to a respective one of said signals, and for directing transversely across said input light beam each of said sound beams at the respective Bragg angle proper to said sound frequency of said sound beam, to Bragg-diffract said input beam into said plurality of output light beams, each bearing a channel of said information, with an optimum Bragg interaction for each sound beam and associated sound frequency.

21. The improvement as in claim 20, in which said transducer means comprises an echelon transducer array.

22. A mutiple-channel information-translation system utilizing a spatially coherent input light beam and simultaneously responsive to a plurality of channels of input signals to produce a like plurality of output light beams each bearing a channel of said information comprising:

a plurality of electrical carrier signal sources corresponding in number to said plurality of information channels, said carrier signals each being of a frequency different from those of the other carriers;

a corresponding plurality of modulators each modulating one of said carrier signals in accordance with a respective modulation signal of one of said information channels;

a light-sound interaction cell interposed in the path of said input beam and transmissive of said beam, said cell including a sound propagating medium and transducer means coupled to said sound propagating medium of said cell and simultaneously receiving said carrier signals for simultaneously launching within said propagating medium a corresponding plurality of sound beams each having a sound frequency and modulation corresponding to a different respective one of said modulated carriers, and for directing transversely across said input light beam each of said sound beams at the respective Bragg angle proper to said sound frequency of said sound beam, to Bragg-diffract said input beam with an optimum Bragg interaction for each sound beam and associated sound frequency into a plurality of output beams, each bearing a channel of said information.

23. A system as in claim 22, in which said transducer means comprises an echelon transducer array.

24. A system as in claim 22, which further includes means for maintaining the intensity of each of said output beams substantially independent of variations in the intensity of the remaining output beams.

* * * * *